3,625,733
Patented Dec. 7, 1971

3,625,733
SUBSTRATE COATING PROCESS
Fred E. Mansur, Toledo, Ohio, assignor to
Owens-Illinois, Inc.
No Drawing. Filed May 16, 1969, Ser. No. 825,410
Int. Cl. C23f 5/02; C23c 17/00
U.S. Cl. 117—46 CA                    5 Claims

ABSTRACT OF THE DISCLOSURE

There is disclosed a process for coating a substrate which comprises applying to the substrate a polymeric based composition comprising a finely divided, particulate inorganic material dispersed in a cyclic isoprenoid solvent and a low molecular weight, low vapor pressure, liquid polymer, said polymer consisting of a poly (alpha substituted) styrene and having a relatively constant viscosity and thixotropic character and capable of being decomposed or pyrolyzed completely to gaseous products at a relatively low temperature without forming a carbonaceous or like residue having a deleterious effect(s) in the application of the composition to the substrate.

THE INVENTION

This invention relates to the preparation of a polymeric based composition which is highly suitable for coating a selected substrate, e.g., for purposes of decorating, protecting, and/or sealing. More particularly, this invention relates to the preparation of a coating or film forming composition comprising a finly divided, particulate, inorganic material dispersed in a cyclic isoprenoid solvent and a low molecular weight, liquid polymer which is capable of being pyrolyzed at a relatively low temperature.

Particulate inorganic coating materials are conventionally applied to substrates by a wet process, that is, while dispersed in a sytem consisting of a binder and a solvent. Such a process typically requires mixing of the binder, the solvent, and the inorganic material to form a paste or slurry which is applied to the surface to be coated, the viscosity of the paste, varying with temperature and the particle size distribution of the inorganic material. Accordingly, quality control is difficult and the solvent-binder technique is costly in time and material.

The wet coating technique is commonly used to seal glass or ceramic parts, as in the formation of cathode ray tubes wherein the face plate is attached to the funnel. In this technique, a paste having solder glass distributed throughout a binder-solvent system is applied to the edges of one part in the form of a ribbon. The remaining part is then placed in contact with the paste and the assemblage is heated to evaporate the solvent, burn out the binder, and fuse the solder glass. While this technique is extensively used, quality control is difficult and expensive because of carbonaceous or like residue which may not be removed by evaporation or burning during the heating step. Likewise, during the evaporation of the solvent, there may be changes in the viscosity and/or thixotropic character of the system which may result in such deleterious effects as orange peel formation, fish eye formation, etc., especially on flat surfaces.

In an effort to overcome the difficulties inherent in applying a coating or sealant to substrates via a binder-solvent system, the prior art has used dry coating compositions containing polymeric binders and having the particulate coating material uniformly distributed therethrough. These compositions are formed into films which are applied to the substrate to be coated and then heated to burn out the binder and form a coating of the inorganic material usually in fused or sintered form. However, the presence of carbonaceous residue may still present a problem in such a system.

Polymethacrylate and polyisobutylene have been used in the prior art for the purpose of dry coating, but have not proven to be entirely satisfactory because these polymeric compositions cannot be conveniently extruded into film form. Films of these compositions are formed by solvent casting which involves many of the disadvantages inherent in the conventional use of binder-solvent systems for applying inorganic coatings. On decomposition, the polymethacrylate and polyisobutylene binders of the prior art leave a detectable carbonaceous residue. This carbonaceous residue is deterimental to successful use of the polymeric materials for many important applications. On heating, the carbonaceous residue reduces to the elemental state metals present as oxides. When the coated material is used in electrical application, the presence of an electrical conductive metal film is disadvantageous. For instance, when the inorganic coating material is solder glass (usually containing lead oxide), the carbonaceous residue acts to reduce the lead oxide to metallic lead. When this metallic lead is present in a seal in a cathode ray tube, it conducts electricity and requires rejection of the tube. Also, the aesthetic value of the coated piece is decreased by the presence of free metals and this has detracted from the use of such films in glazing.

In the copending U.S. patent application of Don N. Gray and John D. Grier, Ser. No. 806,320, filed Mar. 11, 1969, there is disclosed and claimed a polymeric composition which has distinct advantages relative to the prior art.

In the practice of the invention of Gray and Grier, the disadvantages of the prior art are avoided by preparing a polymeric based composition which can be used for coating or forming a film on a suitable substrate without a change of viscosity and/or thixotropic character resulting in such deleterious effects as orange peel formation, fish eye formation, etc., especially on a flat surface.

In accordance with this invention, it has been discovered that the advantages of the Gray-Grier invention are enhanced, especially in the preparation of thick films, by incorporating a cyclic isoprenoid solvent into the polymeric based composition.

More particularly, in accordance with the practice of this invention, there is prepared a polymeric based composition containing finely divided, particulate, inorganic material dispersed in a cyclic isoprenoid solvent and a low molecular weight, low vapor pressure, liquid polymer having a relatively constant viscosity and/or thixotropic character during the heating cycle of the composition and which decomposes or pyrolyzes completely to gaseous products at a relatively low temperature without forming and/or leaving a noticeable carbonaceus or other like residue capable of direct and/or indirect deleterious effects, e.g., such as direct interference by the residue with the decorating and/or adherence characteristics of the composition and/or the conversion by the residue of easily reducible inorganic metal oxides to the elemental state.

In the preferred practice of this invention, there is used a cyclic isoprenoid solvent derived from naval stores products, e.g., turpentine, especially cyclic isoprenoid solvents such as saturated and unsaturated, monocyclic and bicyclic terpenes including diterpenes, triterpenes, sesquiterpenes, and isoprene.

Typical contemplated monocyclic terpene solvents include dipentene, para-cymene, alpha-terpinene, para-menthenes, para-menthane, terpinolene, 2,4(8) - para-menthadiene, thymol, limonene pulegone menthol alpha-terpineol, beta-terpineol, cis-1,8-terpin hydrate, anethole, etc. as well as mixtures thereof. Typical contemplated bicyclic terpene solvents include alpha-pinene, beta-pinene, camphene, camphor, fenchone, sabinol, bornylene, etc., as well as mixtures thereof. Likewise mixture of monocyclic and bicyclic terpenes are contemplated.

Although the boiling temperature of the terpene solvent may range up to about 300° C., terpenes having a lower boiling temperature, e.g., less than about 230° C., preferably less than about 200° C., have been found to be especially suitable.

In the specific practice of this invention, the polymer is selected from polystyrene and/or poly(alpha substituted) styrenes having a low molecular weight of less than about 1000. These polymers are especially suitable since they are in a liquid state over a relatively wide temperature range, e.g., from about room or ambient temperature up to about 300° C. Thus, such polymers are initially in a liquid state when the composition is prepared and remain in such state up to polymer pyrolysis and formation of the coating or film on the substrate, e.g., fusion or fixation of the dispersed solid particles. Likewise, such polymers have a low vapor pressure and relatively constant viscosity and/or thixotropic characteristics.

In the preferred practice of this invention the polymer is a poly(alpha substituted) styrene having the structure

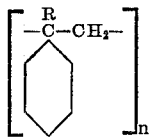

where $n$ is an integer greater than 1 and R is selected from alkyls of less than six carbons, e.g., methyl, ethyl, propyl, butyl, isobutyl isopropyl pentyl isopentyl neopentyl hexyl, etc.

Any finely divided, particulate inorganic coating material can be incorporated into the composition of this invention. By "finely divided, particulate, inorganic coating material" is meant an inorganic, conductive or nonconductive material, in finely divided form, which can be applied to a substrate in the form of a coating, which can be fused, sintered, or particulate. The choice of such materials is virtually unlimited. Suitable materials include by way of example and not limitation, oxides such as silica, alumina and boric oxide; decorative glazes which are glassy compositions containing low melting compounds or fluxes such as the alkali metal oxides, boric oxide and lead oxide; electron emissive compounds, such as the carbonates of barium, strontium and calcium; metals and metallic alloys, such as copper, gold, silver, nickel, platinum etc.; glasses, and thermally crystallizable glasses; solder glasses; and mixture of same.

In a preferred embodiment of this invention the inorganic coating material is solder glass. Solder glasses are well known in the art and are used to seal glass or ceramic surfaces to glass, ceramic or metallic parts. They are also used to coat substrates, especially electrical components such as microcircuits. Vitreous and devitrifiable solder glasses are known in the art and are commercially available. Both types of solder glass can be used in practicing this invention. Exemplary solder glasses for use in the present invention are disclosed in U.S. Pat. Nos. 2,866,298; 2,931,142; 2,936,923; 3,061,664; 3,063,198; 3,080,328; 3,088,833; 3,088,834; 3,088,835; 3,127,278; 3,250,631; 3,291,586 and 3,368,024; all assigned to the assignee of this invention. The solder glass may be used alone or mixed with other inorganic material such as a glass ceramic.

Typical specific solder glass compositions which have been successfully used in the practice of this invention include about 70 to about 80 percent by weight PbO, about 16 to about 8 percent by weight ZnO, about 10 to about 7 percent by weight $B_2O_3$, about 1 to about 10 percent by weight $SiO_2$, about 0 to about 1 percent by weight BaO, and about 0 to about 1 percent by weight $SnO_2$. Such solder glasses have been used alone and/or in combination with about 1 to about 15 percent by weight glass or glass ceramic composition.

The coating composition may be applied to any suitable substrate having any geometric configuration or shape. However, the full advantages of this invention are typically obtained when the composition is applied to a substantially flat surface, e.g., such as a plate glass substrate. However, such surface may contain notches, grooves, or other irregularities for enhancement of the bonding of the coating to the substrate.

The substrate may comprise a wide range of magnetic and non-magnetic materials including glass, ceramic, glass ceramic, metal, carbon, plastic, and mixtures thereof such as ceramic-metallic composites, i.e., cermets. Metal as used herein is intended to include metalloids as well as metal and metalloid oxides. Examples of same include silicon, aluminum, titanium, zirconium, etc., as well as alloys and oxides thereof. If plastic is used for the substrate, it must be capable of taking the heat cycle, e.g., such as some of the high temperature stable polyaromatics.

The proportions of the pyrolyzable polymer, cyclic isoprenoid solvent, and dispersed inorganic material may vary over a broad range depending upon the intended use and required viscosity for the coating composition. Other variables to be considered include the density and particle size of the inorganic material and the desired film thickness. Usually, the cyclic isoprenoid solvent and the pyrolyzable polymer are employed in an amount at least sufficient to serve as an adequate vehicle for carrying the quantity of particles required for a particular use, for example, to provide good coating characteristics in the green (unfused or unsintered) state when the particles are applied to a substrate.

Typically, the coating composition comprises about 90 to about 2 weight percent of the cyclic isoprenoid solvent and pyrolyzable polymer and about 10 to about 98 weight percent of the dispersed, finely divided, particulate, inorganic coating material, the weight ratio of solvent to polymer ranging from about 5:1 to about 1:10, typically about 1:1. Thus, the viscosity of the resulting composition prior to the application of heat and pyrolyzing of the polymer ranges from a highly flowable, e.g., from a sprayable viscosity up to a thick-like paste or putty-like viscosity, e.g., about 50,000 cps. at room temperature.

In addition, the coating composition may comprise other ingredients such as wetting and/or leveling agents which pyrolyze or vaporize cleanly.

Although the composition of this invention has been referred to herein as a coating and/or film forming composition, it is intended that the terms "coating" and/or "film forming" be interpreted to include a wide variety of uses and not be limited solely to the decorating and/or protecting of a surface; that is, the coating composition of this invention may be suitably used on any substrate requiring a continuous or discontinuous layer or film. Thus, the composition may be used in a variety of applications, e.g., to provide a dielectric or conductive layer or lines (continuous or discontinuous) in electronic systems and components; to provide a decorative and/or protective layer; to provide a sealing or bonding layer for a substrate to be attached to another substrate, etc.

In one specific embodiment hereof, it is contemplated using the composition to prepare small electronic dual in line parts, e.g., for sandwiching or laminating an electronic microcircuit, comprising a small, e.g., ¼ inch by ¾ inch, notched alumina substrate containing a layer of glazed coating composition which is about 8 to 10 mils thick.

In another specific embodiment hereof, the coating composition is applied to the surface of a glass substrate in the assemblage of a gaseous discharge display/memory device. The coating is applied to said substrate as a continuous layer, e.g., so as to provide a dielectric coating thereon, or as continuous or non-continuous, conductive thin lines, e.g., so as to provide electrodes thereon.

Multiple gas discharge display and/or memory panels of the type with which the present invention is concerned are characterized by an ionizable gaseous medium, usually a mixture of two gases at an appropriate gas pressure, in a thin gas chamber or space between a pair of opposed dielectric charge storage members which are backed by conductor (electrode) members comprising a series of thin lines or dots, the conductor members backing each opposing dielectric member being transversely oriented to define a plurality of discrete discharge volumes and constituting a discharge unit. Likewise, in some panels the discharge units are additionally defined by surrounding or confining physical structures such as by cells or apertures in perforated glass plates and the like so as to be physically isolated relative to other units. Typically, the dielectric member and conductor member are applied to a supporting glass substrate with two spaced substrates being appropriately assembled to make up the panel. In this invention, the novel polymeric coating composition can be used to apply the dielectric and/or the conductive electrodes to the substrate and also to seal the edges around the assembled spaced substrates.

The coating composition may be applied to the substrate by any suitable means or technique including extrusion, Meyer rod coating, blade coating, spraying, dipping, and printing methods such as silk screening. Silk screening is especially suitable for applying the coating composition as thin lines on a substrate, e.g., as electrode lines in the form of finely-divided fuse conductive material such as gold or silver on the glass substrate of a gaseous discharge display/memory device. Likewise, such thin lines, conductive or non-conductive, continuous or non-continuous, can be applied to the substrate by means of line printing apparatus and method as disclosed and claimed in the U.S. patent application of John D. Grier, Ser. No. 796,797, filed on Feb. 5, 1969, and assigned to the same assignee hereof.

Although the coating composition can be applied to the substrate in a single step, e.g., by one of the aforementioned techniques, it is contemplated that such step may be repeated so as to build up the thickness of the layer on the substrate. Thus, in one embodiment hereof, the coating composition is applied to the substrate, suitably dried, and the sequence repeated several times, e.g., 2 to 8 times, until a desired green state coating thickness, e.g., about 4 to 20 mils, is obtained. The built-up coating (comprised of multiple dried layers) is then suitably cured by heating, e.g., in one or more ovens, so as to pyrolyze the polymer and fuse the inorganic material. In such multiple layer embodiment, the drying of the applied coating is typically by means of radiant heat, e.g., infrared, in an amount sufficient to dry the top (exposed) portion of the coating without fusing the inorganic material.

The fusing or sintering conditions of the single or multiple layers of inorganic material will be a function of the material and the intended use of the coated substrate. Typically, the degree of smoothness, e.g., of a glazed surface coating, is determined by the length of time the required fusion or sintering heat is applied.

If the solid inorganic material comprises a solder glass of the crystallizable type and the coated substrate is to be subsequently sealed or bonded to another surface by the heating of the coating, the solder glass coating is initially fused to the substrate at a temperature below the crystallization temperature of the solder glass. The coated substrate is then reheated and the vitreous solder glass coating is crystallized during the subsequent sealing step.

The particle size of the solid, inorganic material may vary over a wide range, e.g., from very fine to very coarse. Typically, the more fine the particles, the greater the surface area and the greater the proportion of cyclic isoprenoid solvent and pyrolyzable, liquid polymer which are required.

Although the pyrolyzable, liquid polymers contemplated herein can be readily prepared, such are also commercially available. For example, The Dow Chemical Company of Midland, Mich. markets poly (alpha methyl) styrene under the trade names of Dow Resins 276–V2 and 276–V9. The properties of these two particular resins are summarized in Table I hereinafter.

TABLE I

| Property | 276–V2 | 276–V9 |
| --- | --- | --- |
| Color [1] (Iodine Standard) | 0.85 | 0.85 |
| Boiling range (5% to 90%) at 5 mm. Hg, °C | 150–300 | 150–300 |
| Specific gravity at 60/60° C | 1.01 | 1.04 |
| Pounds/Gallon at 25° C | 8.40 | 8.66 |
| Viscosity at 60° C., centipoises | 100–200 | 700–1,000 |
| Flash point (approximately), °C | 166 | 182 |
| Fire point, °C | 182 | 207 |
| Volatility—100 hrs. at 100° C., percent | 28–32 | 18–20 |
| Refractive Index at 60° C | 1.58 | 1.57 |
| Acid Number | <0.1 | <0.1 |
| Iodine Number | <4.0 | <4.0 |
| Dielectric constant ($10^3$ c.p.s.) | 2.56 | 2.60 |
| Dissipation factor ($10^3$ c.p.s.) | 0.0001 | 0.0005 |
| Viscosity at 60° C., centipoises | 100–200 | 700–1,000 |

[1] Water white.

In accordance with a further embodiment of this invention, it is contemplated that polymers of different molecular weight may be appropriately blended so as to obtain specifically desired viscosity and/or thixotropic characteristics.

Although not set forth in the Table I, the molecular weight of poly(alpha methyl)styrene may range from about 250 to about 1000.

The following example represents one of the best modes contemplated by the inventor in the practice of this invention.

EXAMPLE

A polymeric based coating composition was prepared by dispersing 600 grams of finely-divided inorganic material in 50 grams of cyclic isoprenoid solvent and 50 grams of liquid poly(alpha methyl)styrene.

The inorganic material consisted of about 95 percent by weight vitreous particles and about 5 percent by weight glass ceramic. The particle size consisted of about 74 percent by weight particles equal to or less than 400 mesh. The balance of the particles ranged up to about 100 mesh.

The composition of the inorganic material consisted essentially of 5.37 percent by weight $SiO_2$, .15 percent by weight $Na_2O$, 71.00 percent by weight PbO, 12.3 percent by weight ZnO, 7.78 percent by weight $B_2O_3$, .06 percent by weight $K_2O$, .18 percent by weight BaO, 1.17 percent by weight $Al_2O_3$, .23 percent by weight $Li_2O$, and 5.0 percent by weight glass ceramic.

The polymer was DOW 276–V2. The solvent was Hercules Terpineol 318 and consisted of 55 to 60 percent by weight alpha-terpineol, 17 to 22 percent by weight beta-terpineol, 20 percent by weight other tertiary alcohols boiling in the alpha-terpineol range, and 3 percent by weight terpene hydrocarbons and cineole. The solvent had a boiling temperature at one atmosphere absolute of about 220° C., a specific gravity of 0.939, a refractive index of 1.482, a flash temperature (Cleveland open cup) of 88° C., and a Kauri-butanol solvency value greater than 500.

When applied to a suitable substrate by a silk screen process and heated, complete burn-out and curing of the composition resulted at about 300° C.

The composition was found to be ideally suitable for sealing the glass substrates of a gaseous discharge display/memory panel and also for preparing a laminated electronic micro-circuit, e.g., as described hereinbefore.

Although this invention has been described hereinbefore with reference to certain specific embodiments, it will be understood by those in the art that modifications can be made within the scope of the hereinafter claims.

I claim:
1. A process for coating a substrate with a layer of inorganic material which comprises applying to the substrate a polymeric-based composition containing particulate inorganic material dispersed in a cyclic isoprenoid solvent and a low molecular weight, low vapor pressure, liquid polymer having a molecular weight of less than about 1000 and consisting of poly (alpha substituted) styrene having the structure

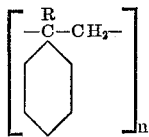

where
n is an integer greater than 1 and R is selected from alkyls of less than six carbons, said polymer having a relatively constant viscosity and thixotropic character and capable of being pyrolyzed to gaseous products at a temperature below the fusing temperature of the inorganic material without formation of a residue having a deleterious effect on the inorganic material, heating the applied composition to a temperature sufficient to evaporate the solvent and pyrolyze the polymer without fusing the particulate inorganic material, and a higher temperature sufficient to fuse inorganic material to the substrate.

2. The process of claim 1 wherein the composition comprises about 90 to about 2 weight percent of the cyclic isoprenoid solvent and the polymer and about 10 to about 98 weight percent of inorganic material, the weight ratio of solvent to polymer ranging from about 5:1 to about 1:10.

3. The process of claim 1 wherein the solvent is selected from saturated or unsaturated, monocyclic or bicyclic terpenes and mixtures thereof.

4. The process of claim 3 wherein the solvent has a boiling temperature of less than about 300° C. at an absolute pressure of 1 atmosphere.

5. The process of claim 4 wherein the solvent boiling temperature is less than about 230° C.

References Cited
UNITED STATES PATENTS

| | | | |
|---|---|---|---|
| 2,312,229 | 2/1943 | Anderson | 117—46 CA |
| 2,328,101 | 8/1943 | Rosenblatt | 117—46 CA |
| 3,475,161 | 10/1969 | Ramirez | 117—46 CA |
| 2,461,878 | 2/1949 | Christensen et al. | 117—46 CA |
| 2,551,712 | 5/1951 | Soby | 117—46 CA |
| 3,208,892 | 9/1965 | Miller et al. | 117—46 CA |
| 3,231,540 | 1/1966 | Vanderbilt | 117—46 CA |
| 2,985,547 | 5/1961 | Luks | 117—46 CA |

WILLIAM D. MARTIN, Primary Examiner

M. SOFOCLEOUS, Assistant Examiner

U.S. Cl. X.R.

117—119.6, 129, 212, 227, 130, 124 A, 169 R; 264—63; 106—285